United States Patent [19]

Klüting

[11] 4,406,497
[45] Sep. 27, 1983

[54] APPARATUS FOR SECURING A VARIABLE POSITION FITTING ELEMENT, PARTICULARLY A FITTING ELEMENT FOR VEHICLE SEATS

[75] Inventor: Bernd Klüting, Radevormwald, Fed. Rep. of Germany

[73] Assignee: Keiper Automobiltechnik GmbH & Co. KG, Fed. Rep. of Germany

[21] Appl. No.: 241,854

[22] Filed: Mar. 9, 1981

[30] Foreign Application Priority Data

Mar. 13, 1980 [DE] Fed. Rep. of Germany ....... 3009640

[51] Int. Cl.³ .............................................. A47C 1/026
[52] U.S. Cl. ................................... 297/366; 248/396; 297/325
[58] Field of Search ................................ 297/366–371, 297/354, 355, 363–365, 325, 313, 337, 338; 248/396, 394, 421; 74/534, 576

[56] References Cited

U.S. PATENT DOCUMENTS

| | | | |
|---|---|---|---|
| 2,655,052 | 10/1953 | Montalto | 74/576 |
| 4,190,225 | 2/1980 | Bauer et al. | 248/396 X |
| 4,223,946 | 9/1980 | Klüting | 297/363 |
| 4,247,071 | 1/1981 | Carella et al. | 248/396 |
| 4,295,682 | 10/1981 | Klüting et al. | 297/364 X |

FOREIGN PATENT DOCUMENTS

| | | | |
|---|---|---|---|
| 89498 | 3/1896 | Fed. Rep. of Germany | 74/576 |
| 2507092 | 8/1975 | Fed. Rep. of Germany | 297/366 |
| 1414700 | 9/1965 | France | 297/366 |
| 1422786 | 1/1976 | United Kingdom | 297/367 |

*Primary Examiner*—William E. Lyddane
*Attorney, Agent, or Firm*—Wigman and Cohen

[57] ABSTRACT

An apparatus for setting a fitting element which is adjustable relative to a support element to various positions, particularly a fitting element for vehicle seats is disclosed. The apparatus includes a locking device which is self-arresting under a load from the return force and having at least two locking elements which engage each other by teeth means which prevent movement of the fitting element, one of said locking elements positioned on the fitting element and the other of said locking elements being movably guided on the support element and movable forcibly only into the locking position against a return force by means of said activating member.

9 Claims, 7 Drawing Figures

Fig. 6.

APPARATUS FOR SECURING A VARIABLE POSITION FITTING ELEMENT, PARTICULARLY A FITTING ELEMENT FOR VEHICLE SEATS

BACKGROUND OF THE INVENTION

The invention relates to vehicle seats generally and more particularly to apparatus for setting a fitting element which is adjustable relative to a support element to various positions.

When such an apparatus is used as an articulated fitting for a vehicle seat, a return spring is employed which produces the return force. The spring is stretched more and more as the back rest together with the fitting element connected thereto are rotated farther and farther rearward after the locking member has been released from engagement with the retaining teeth. In contrast, the extension of the return spring does not change when a locking device is released and the backrest is folded forward while maintaining the relative rotational position of the fitting element, in order, for example, to facilitate access to the back seats in two-door vehicles. If the activating member causes the locking member to be lifted out of the retaining teeth while the backrest is in the forward-folded position, the fitting element associated with the backrest is rotated forward at great acceleration by the force of the return spring, because the mass of this fitting element is very low compared to the energy stored in the return spring. Particularly when the backrest has been folded forward from a fully reclined position, where the return spring is accordingly stretched a great deal, the impact of the fitting element against the end stop which limits its movement can be so strong that the end stop of other parts of the fitting can be destroyed.

OBJECT AND SUMMARY OF THE INVENTION

Accordingly, it is an object of the invention to provide an apparatus of the type as aforementioned, in which the activating member of the locking device can be brought into the release position at any time without danger of damage or destruction to parts of the apparatus.

In an apparatus of the above-described type this object is achieved according to the invention by a locking device which has at least two locking elements with teeth which engage each other when in a locking position to prevent movement of the fitting element, and which is self-arresting under a load from the return force.

One such locking element is provided on the fitting element and the other is movably guided on the support element and can only be forced into the locking position by the activating member against a return force. The fact that a locking device is provided which is self-arresting and the fact that a movement of the activating member can only cause the movable locking element of this locking device to move into the locking position and cannot force it out of the locking position achieves a situation in which movement of the activating member into its release position is not sufficient to eliminate the locking effect of the locking device. Thus, even when the locking device is released and the backrest is folded forward the activating member can be activated without danger and without fear that the movable locking element will leave the locking position. In order to achieve this, when it is desired to release the arresting effect for a desired rotational movement of the fitting element associated with the backrest, an additional condition must be met, namely, that the self-arresting forces acting on the movable locking element to hold it in its locked position are smaller than the return force acting on this locking element. Accordingly, one need only select the size of the return force with respect to the effect of the self-arresting force so that the lifting of the movable locking element out of the locking position while acted upon by the return force can occur only when the flanks of the engaged teeth of the locking elements are at least partially unloaded, i.e., when, for example, with an articulated fitting above the upholstery support of the backrest of the seat a force is exerted which is directed against the action of the spring force of the return spring. When this is the case there can be no free, sudden or quickly ending movement of this fitting element under the influence of the force of the return spring.

The structure can therefore be designed wherein at least the tooth flanks of the teeth of the locking elements which abut each other under a load from the return force have an inclined angle relative to the direction of movement of the movably guided locking element which is at least equal to the resting frictional angle. In this arrangement of the teeth of the locking elements the size of the self-arresting frictional force which must be overcome by the return force to release the movable locking element becomes larger the greater is the load on these teeth by the return spring. The strength of the return force can be selected such that a reliable release of the movable locking element from its locking position takes place as soon as the load on the teeth of the locking device decreases to a sufficiently low value, where it is desired to allow a release to the free position by moving the activating lever.

In one exemplary embodiment the detent member serving to arrest the movable fitting element in the position corresponding to the desired reclining angle is formed as one of the locking members and the portion of the movable fitting element supporting the detent notches is formed as the other locking member. In order to produce the frictional force which causes the self-arresting effect under a load and which prevents the detent member from being disengaged by the return force acting thereon, the detent notches can be provided with a saw-tooth shape.

Instead of using the detent member as the movable locking element, the locking member which is moved by the activating member into the locking position can be formed by a latch which is present in addition to the detent member.

If it is not desired to provide the detent notches with a tooth shape which acts in this self-arresting manner, the structure can be designed so that the latch provided in addition to the detent member cooperates with a separate set of notches provided in addition to the detent notches and which preferably extends parallel thereto, which additional notches have a tooth shape acting in a self-arresting manner.

Alternatively, the normal detent notches can form the notches of the other locking member engaging with the latch and where only the latch has a tooth shape which satisfies the condition for self-arresting.

In the exemplary embodiments in which the detent member serves as the movable locking element of the locking device, a slidably guided detent slide or a pivotably mounted detent latch can be provided as the detent member. In both cases at least one spring acting on the movable locking element can be provided to produce the return force. With the use of a pivotable mounted latch the position of the pivot axis and the arrangement of the center of gravity of the latch can also be selected in such a manner that the force of gravity acts to produce the return force and, accordingly, no lifting spring need be provided for this purpose.

It should be noted that the apparatus according to the present invention is used to advantage not only with fitting elements of an articulated fitting, i.e., in fitting elements serving in the adjustment of the reclining angle of the backrest of the seat, but is also advantageously used in fitting elements which are provided for other adjustment measures, such as fitting elements for the height adjustment of a vehicle seat where it is important that the detent between the movable fitting element and an associated support element can be released under forces which are not excessive, such as when the seat surface is loaded by the weight of the user of the seat.

BRIEF DESCRIPTION OF THE DRAWINGS

The invention will be described in greater detail below with the aid of the exemplary embodiments illustrated in the drawings, wherein.

DETAILED DESCRIPTION OF THE PREFERRED EMBODIMENTS

Figures 1, 2:
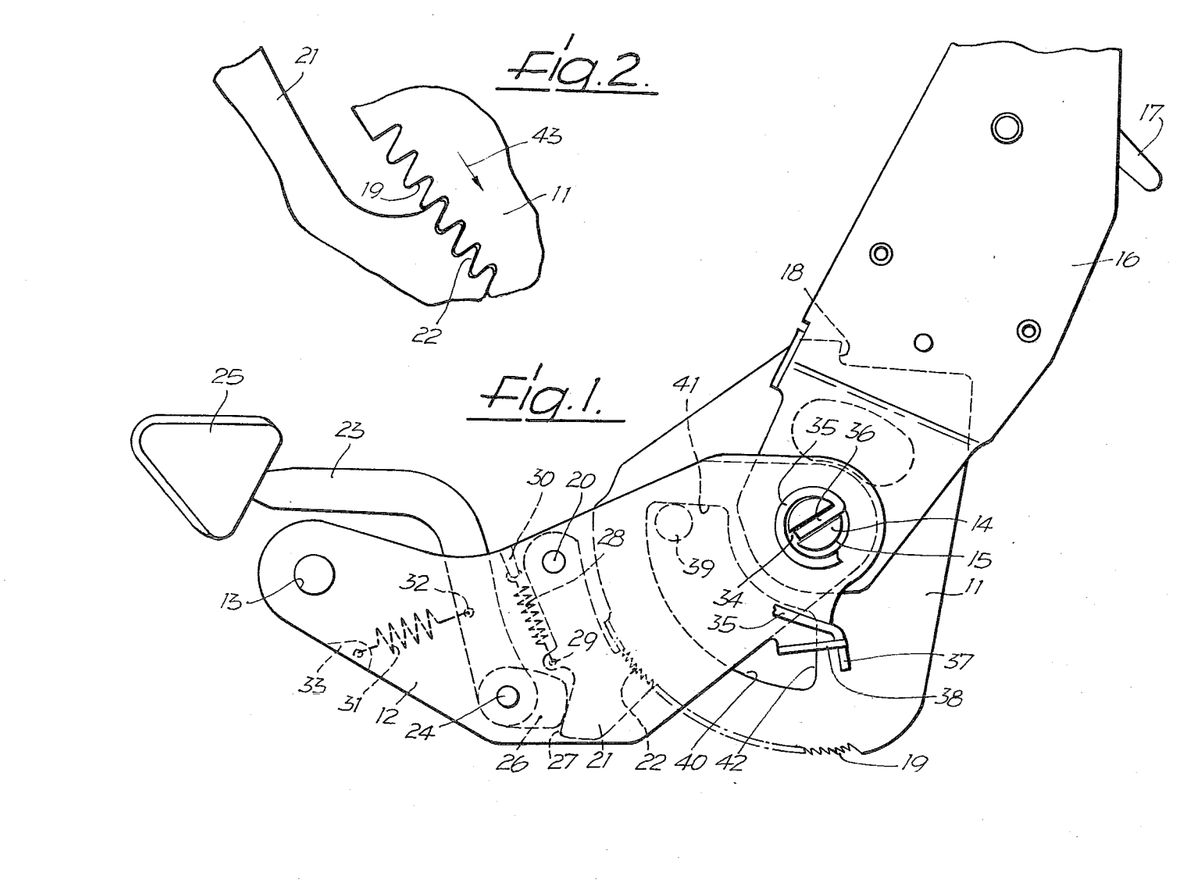
FIG. 1 is a partially cut-away side view of an articulated fitting having an apparatus according to an exemplary embodiment of the present invention.
FIG. 2 is an enlarged, cut-away section, of FIG. 1, which shows a portion of the detent notches with the associated detent member.

FIG. 1 shows an articulated fitting for vehicle seats equipped with an exemplary embodiment of the apparatus according to the present invention. The apparatus includes a movable first fitting element 11 in the form of a smooth flat steel plate and a second fitting element 12 which serves as the support element and is rigidly connected with the lower portion of the seat (not shown) of the associated vehicle seat. This second fitting element 12 is also formed as a flat plate. Although many attachment points can be provided on the fitting element 12 for connection with the lower portion of the seat, for purposes of convenience only one attachment point in the form of a bore 13 is shown in the vicinity of the front end of the fitting element 12.

A movable fitting element 11 is pivotably mounted relative to the stationary fitting element 12 by means of a pivot pin 14. Pin 14 is connected to the movable fitting element 11 and extends laterally perpendicular to the plate plane and passes through a bore 15 in the stationary fitting element 12. A side element 16 of the upholstery support (not shown in FIG. 1) of the backrest of the seat is pivotably mounted between the fitting elements 11 and 12 on the pivot pin 14. A releasable locking device, which can be of conventional construction and which is not shown in detail in the drawing, normally locks the side element 16 in the rotational position illustrated in FIG. 1 relative to the movable fitting element 11. A manually activated release lever 17 is provided to unlock the locking device by raising a locking member (not shown) out of a locking shoulder 18 on the upper edge of the fitting element 11, so that the side element 16, and therewith the backrest of the seat, can be freely pivoted forward relative to the fitting element 11 about the axis of the pivot pin 14, for example, in order to facilitate access to the rear seats of the associated vehicle.

When the locking device is in the normal locking position, the rotational position of the fitting element 11, which is pivotable about the axis of the pivot pin 14 relative to the stationary fitting element 12, is characteristic for the rotational position of the side element 16 and thereby determines the angle of inclination of the backrest. In other words, the adjustment of the angle of the backrest can be changed by rotating the fitting element 11.

In order to releasably set the fitting element 11 in the rotational position corresponding to a desired angle of inclination, the fitting element 11 is formed as a detent disc, which is provided with detent notches 19 on its forward edge facing the fitting element 12 and is concentric to the axis of the pivot pin 14. A detent member, which in the illustrated exemplary embodiment is formed as a detent latch 21, is movably mounted on the stationary fitting element 12 for engagement with the detent notches 19. This detent latch 21 is pivotably mounted in the vicinity of its upper end on a pin 20, which is connected to the fitting element 12. The detent latch 21 is provided with teeth 22 in a lateral edge region facing the detent notches 19 of the fitting element 11. Teeth 22 enter into engagement with the detent notches 19 when the detent latch 21 is rotated toward the detent notches 19.

This rotation of the detent latch 21 toward the detent notches 19, i.e., the arresting of the rotational position of the movable fitting element 11 relative to the stationary fitting element 12 by establishing the detent engagement between the teeth 22 and the detent notches 19 can be forcibly produced by means of an activating lever 23. The activating lever 23 is pivotably mounted on the stationary fitting element 12 on a pin 24 connected therewith. The free end of the activating lever 23 carries a handle 25 for manual activation by the user of the seat. On the other end of the activating lever hinged to the pin 24 there is attached a control cam 26, which includes a control surface 27 in cooperation with the detent latch 21. The control surface 27 of the cam 26 forcibly rotates the detent latch 21 into the arresting position shown in FIG. 1, where the teeth 22 engage the detent notches 19. In the arresting position shown in FIG. 1, therefore, the movable fitting element 11 is held in its then current rotational position.

As viewed in FIG. 1, if the user of the seat rotates the activating lever 23 clockwise out of the arresting position into the released position the control cam 26 moves downward out of the vicinity of the control surface 27, thus making it possible for the detent latch 21 to rotate clockwise about the pin 20 in order to cancel the detent engagement between the teeth 22 and the detent notches 19. When this occurs the side element 16 of the backrest and therewith the movable fitting element 11 can be rotated in order to change the angle of inclination of the backrest when this is desired.

When the activating lever 23 is in the released position, the teeth 22 and the detent notches 19 can be brought out of detent engagement by a return force acting on the detent latch 21, which in the exemplary embodiment shown in FIG. 1 is produced by a lift spring 28 arranged between a securing eye 29 on the detent latch 21 and a securing eye 30 on the stationary fitting element 12. This spring 28 acts as a draw spring. With the position of the pivot axis (pin 20) of the detent latch 21 shown in FIG. 1 and with the position of the center of gravity thereof resulting from the illustrated shape of the detent latch 21, the force of gravity produces a clockwise return force for the rotational movement of the detent latch 21 in addition to the lift spring 28. If the weight is sufficiently high, therefore, the lift spring 28 could be eliminated.

If after rotation of the activating lever 23 into the released position the user of the seat again releases the lever, under the influence of the arresting spring 31, which is stretched between an attachment bore 32 in the activating lever 23 and an attachment lug 33 on the fitting element 12, returns to its arresting position shown in FIG. 1. During the course of this movement the contact between the control cam 26 and the control surface 27 of the detent latch 21 forces a counter-clockwise rotation of the detent latch 21 into the engaged position shown in FIG. 1, where the teeth 22 again engage the detent notches 19 in order to hold the fitting element 11 in its then current rotational position.

The pivot pin 14 is provided with a groove 34 on its outer end and the inner end 36 of a pre-biased flat spiral spring 35 which serves as a return spring and of which only the ends are shown in FIG. 1 engages this groove 34. The outer end 37 of this spring 35 is supported in a depression in a bent-out flap 38 formed on the stationary fitting element 12. The spring force of the pre-biased flat spiral spring 35 exerts a torque on the movable fitting element 11 above the pivot pin 14 and thus acts as a return force tending to rotate the movable fitting element 11 counter-clockwise relative to the stationary fitting element 12 into a forward end position which is shown in FIG. 1. In this forward end position, an end stop 39, which is connected to the inside of the stationary fitting element 12 and engages into an opening 40 in the movable fitting element, abuts the front edge 41 of the opening 40 to form a forward limit to the range of rotational movement of the fitting element 11 and to thereby limit the adjustment of the angle of inclination of the backrest.

The return force of the biased flat spiral spring 35 is increased even further when the movable fitting element 11 is rotated clockwise out of the end position shown in FIG. 1, i.e., when the backrest is further reclined. In the fully reclined position of the backrest, when the stop 39 is located in the vicinity of the rear edge 42 of the opening 40, the flat spiral spring 35 is fully wound. If, when the fitting element 11 is rotated out of the forward end position shown in FIG. 1, the detent engagement between the teeth 22 and the detent notches 19 is released, the return force of the flat spiral spring 35 can be decreased as the fitting element 11 is rotated counter-clockwise until the abutment shown in FIG. 1 of the stop 39 against the front edge 41 is reached. This decrease in the force of the flat spiral spring 35, however, must not be allowed to occur when the side element 16 and therewith the backrest are folded forward. In this case, where the locking device which normally connects the side element 16 to the locking shoulder 18 of the fitting element 11 in a locked engagement is in its unlocked position, the fitting element 11 can be freely moved independently, so that when the arresting relationship between the teeth 22 and the detent notches 19 is eliminated, a sudden rotation of the fitting element 11 in a counter-clockwise direction takes place. Because the flat spiral spring 35 must be formed as a very strong spring in order to guarantee a reliable retraction of the backrest from a reclined position, the kinetic impact energy which would be released in a free discharge against the stop 39 is so high that destruction of the mechanism could result. To prevent this from occurring in the device illustrated here, the detent notches 19 and the teeth 22 of the detent latch 21 are provided with a saw tooth shape, as is seen clearly in the enlarged section shown in FIG. 2. With this tooth shape arrangement the load exerted on the teeth 22 and the detent notches 19 by the flat spiral spring 35, which tends to move the detent notches 19 relative to the teeth 22 of the detent latch 21 in the direction of arrow 43 in FIG. 2, produces a frictional force which acts as a self-arresting force countering the return force (lift spring 28), which tends to lift the teeth 22 out of the detent notches 19. Because of this self-arresting capability and because of the fact that the activating lever 23 can only forcibly rotate the detent latch 21 into the locking position but cannot force it to move out of the locking position, the user of the seat can at any time move the activating lever 23 out of the arresting position shown in FIG. 1 into the released position without danger. If this occurs when the side element 16 is folded forward, the detent latch 21 remains in the locking position, because when the full load of the flat spiral spring 35 acts on the detent notches 19 the self-arresting feature is active, since the frictional force produced under a load is stronger than the return force acting on the detent latch 21. If the side element 16 and therewith the backrest are locked with the movable fitting element 11, however, then the backrest exerts a torque on the fitting element 11 in the sense of an unloading of the detent engagement between the teeth 22 and the detent notches 19. In such a case, if the activating lever 23 is then rotated into the release position in order to carry out a desired change in the angle of inclination of the backrest, then the detent latch 21 can simply be moved out of the locking position shown in FIG. 1 under the influence of the return force. After completion of the desired adjustment in the backrest angle, the activating lever 23 is allowed to return into the arresting position shown in FIG. 1, whereby the detent latch 21 is forcibly returned into the locking position by means of the control cam 26.

Figure 3:
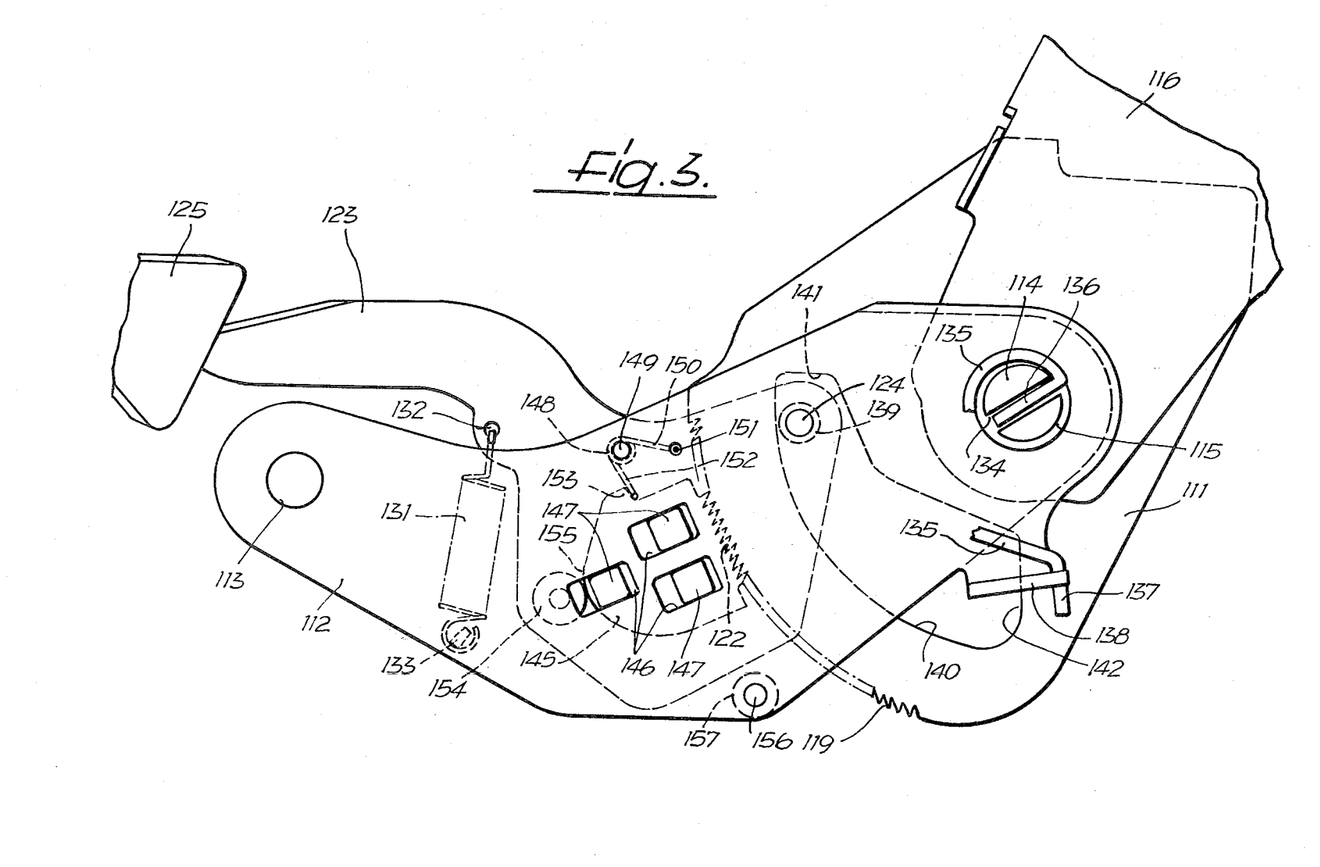
FIGS. 3 and 4 are enlarged, partially cut-away side views similar to FIG. 1, having two further exemplary embodiments of the apparatus.

FIG. 3 shows a somewhat enlarged, modified exemplary embodiment, in which the elements which correspond to those in FIGS. 1 and 2 are designated by reference numerals increased by 100. The embodiment shown in FIG. 3 is distinguished from the embodiment according to FIGS. 1 and 2 principally by the fact that the detent member which is movably guided on the stationary fitting element 112 which serves as the support element is not formed as a pivotable detent latch, but rather in the shape of a detent slide 145 guided along a straight path. This detent slide 145 is illustrated in FIG. 3 in its locking position, where its teeth 122 stand in detent engagement with the detent notches 119 of the movable fitting element 111. Slot-like openings 146 formed in the stationary fitting element 112 serve as the guide for the straight movement of the detent slide 145 between its locking position and its retracted position. Sliding blocks 147 engage in the slot-like openings 146 and extend laterally out of the plane of the detent slide 145. To produce the return force a shank spring 148 is provided which is arranged on a bolt 149 of the fitting element 112. Shank spring 148 extends at one end 150 into a bore 151 of the fitting element 112 and is supported at its other end 152 on a shoulder 153 of the detent slide 145. In this manner the shank spring 148 tends to push the detent slide 145 out of the arresting position. For the forced return of the detent slide 145 into the locking position when it has been removed therefrom, a control roller 154 is rotatably mounted on the activating lever 123. This control roller 154 follows a control edge 155 of the detent slide 145 during movement of the activating lever 123 into its arresting position shown in FIG. 3 in order to push the detent slide 145 into the locking position. If the activating lever 123 is rotated out of the position shown in FIG. 3 about the pin 124, which in this embodiment is formed in one piece with the stop 139, and rotated into the released position, the control roller 154 moves out of the vicinity of the control edges 155, so that the detent slide 145 is released. Then, either the return force produced by the shank spring 148 begins to act on the detent member 145 in order to push it out of its locking position, or the return force is overcome by the self-arresting frictional forces between the teeth 122 and the detent notches 119 when the full load of the flat spiral spring 135 is active. Accordingly, this exemplary embodiment also deals with a self-arresting locking device which acts as a safety mechanism and always prevents cancellation of the arresting forces between the detent slide 145 and the movable fitting element 111 when the full load of the flat spiral spring is active and a free movement of the fitting element 111 must be prevented, regardless of whether the activating lever 123 might be moved into the release position.

As an attachment point for connecting the fitting element 112 serving as the support element with the lower portion of the seat (not shown), there is provided, in addition to the bore 113, an additional attachment bore 156, which is engaged by an attachment bolt 157, as seen in FIG. 3.

Figures 4, 5:
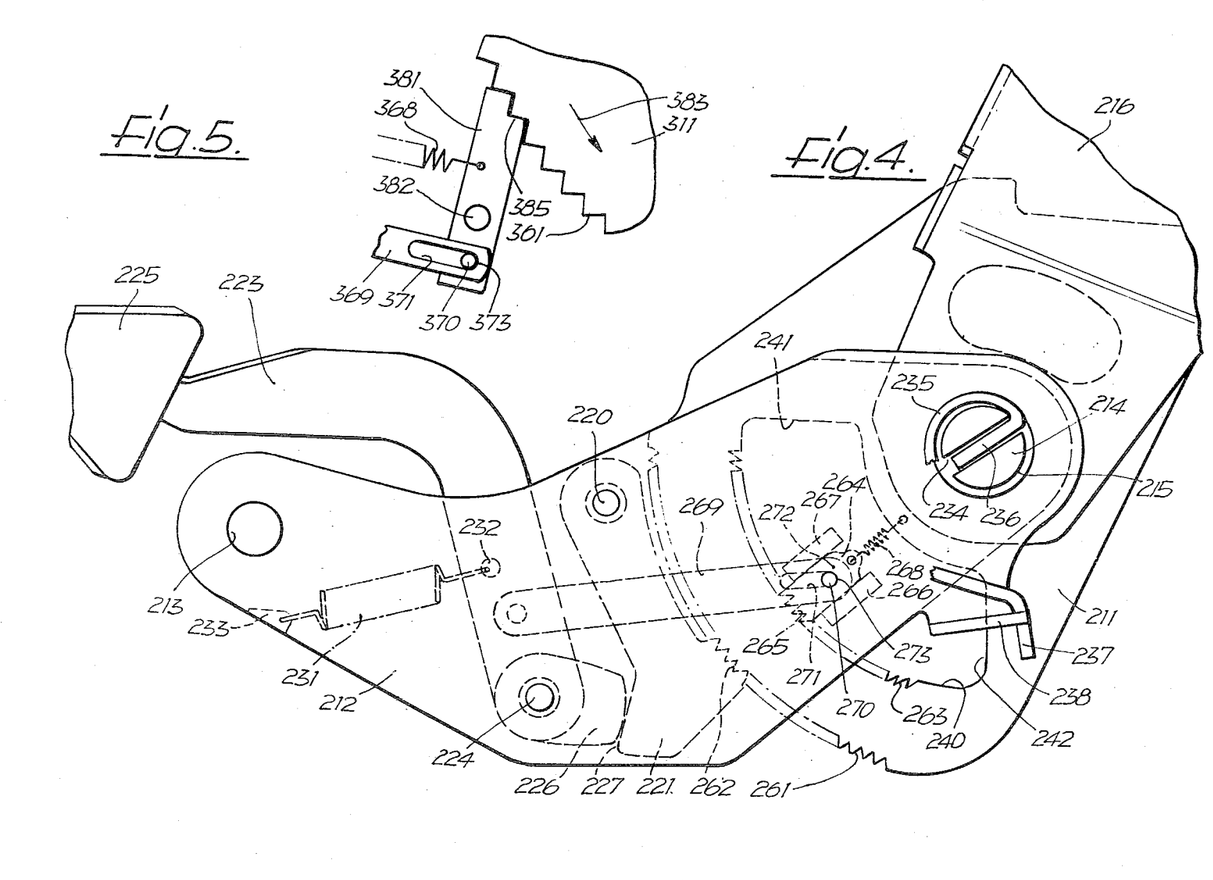
FIG. 5 is a section similar to that shown in FIG. 2 relating to a further exemplary embodiment.

FIG. 4 illustrates a further exemplary embodiment, in which elements corresponding to those in the exemplary embodiment according to FIG. 1 are designated with reference numerals increased by 200.

Just as in the embodiment illustrated in FIGS. 1 and 2, in the embodiment of FIG. 4 there is provided a detent latch 221 mounted at its upper end on a pin 220 so as to be pivotable thereabout for securing the movable fitting element 211 in the desired rotational position. In contrast to the embodiment according to FIGS. 1 and 2, however, no lift spring is provided to produce the return force which rotates the detent latch 221 clockwise to release the arresting forces when the activating lever 223 is moved into the release position and the control cam 226 is accordingly moved out of the vicinity of the control surface 227. Instead, the return force is provided exclusively by the force exerted by the detent notches 261 on the teeth 262 of the detent latch because of the inclined flanks of the teeth.

In contrast to the embodiment of FIGS. 1 and 2, the detent notches 261 formed on the front edge of the fitting element 221 facing the detent latch 221 do not have the saw tooth shape. Rather a normal detent notch shape is provided. For the same reason, the teeth 262 of the detent latch 221 cooperating therewith also have a normal tooth shape. Accordingly, the tooth engagement on the detent latch 221 is not self-arresting. As security against an unwanted cancellation of the arresting of the fitting element 211, in this embodiment, an additional self-arresting locking device is provided, which includes a separate set of safety teeth 263. These additional teeth 263 are formed on the edge of the opening 240 in the fitting element 211 running adjacent and parallel to the detent notches 261. The teeth 263 are formed in the shape of saw teeth to produce a self-arresting frictional force which appears during teeth engagement under load. A safety slide 264 cooperates with the safety teeth 263. The teeth of slide 265 are accordingly also provided with the saw tooth shape. The safety slide 264 is guided between guide bodies 266 and 267, which are attached to the stationary fitting element 212, for a straight sliding movement. A lift spring 268 which acts on the safety slide 264 produces a return force which tends to lift the safety slide out of the locking position shown in FIG. 4, where the teeth of slide 265 are in engagement with the safety teeth 263. In order to force the safety slide 264 out of the released position into the arresting position in its locking position in dependence on the movement of the activating lever 223, in which locking position on the teeth of slide 265 engage in the safety notches 263, an arresting lever 269 is hinged to the activating lever 223. This arresting lever 269 is coupled with the safety slide 264 by means of a pin-slot connection. For this purpose a pin 270, which extends laterally out of the plane of the safety slide and is connected therewith, engages in a longitudinal hole 271 formed on the free end 272 of the arresting lever 269. The position and length of this longitudinal hole 271 is selected such that when the safety slide 264 is in the locking position, movement of the activating lever 263 into the released position causes no movement of the safety slide 264, since the pin 270 slides freely in the longitudinal hole 271. If, however, when the safety slide 264 is drawn into its released position by the return force of the spring 268, the activating lever 223 is moved out of the release position back into the arresting position, because of the contact of the pin 270 on the outer edge 273 of the longitudinal hole 271, the safety slide 264 is forced into the locking position.

In this embodiment, as before, the self-arresting locking device formed with an additional safety slide 264 having separate associated safety teeth 263, is not forcibly cancelled by movement of the activating member 223, but rather can only be forcibly pushed into the locking position. In this way, the same result is achieved as was described in connection with the previous embodiments, namely, the effect that a disengagement of the self-arresting lock under the influence of the return force is possible only when the self-locking lock mechanism does not stand under the load of the force of the flat spiral spring 235 serving as a return spring.

FIG. 5 shows a section illustrating details of a further exemplary embodiment. As in the embodiment of FIG. 4, a normal detent notch set 361 is provided without saw touch shaped teeth on the outer edge of the movable fitting element 311. This detent notch set 361 cooperates with a normal detent latch (not shown), which can be disengaged to change the angle of inclination of the backrest by rotating the fitting element 311, whereby the same construction can be provided as in the embodiment of FIG. 4, where the detent latch is provided with normal detent notches, is pivotably mounted at its upper end and can be engaged by a control cam of the associated activating lever. The disengaging can take place as in the exemplary embodiment according to FIG. 4.

An additional safety latch 381 is provided as the self-arresting locking device to prevent untimely release of the arrest of the fitting element 311. This safety latch 381 is pivotably mounted on a pin 382 and which has teeth 385 on the free end thereof provided for engagement with the detent notches 361. These teeth 385 have a shape which, together with the normal tooth shape of the detent notches 361, produces a frictional force serving as the self-arresting force. This frictional force prevents a counter-clockwise rotational movement of the detent latch 381 about the pin 382 when the fitting element 311 is biased in the direction of the arrow 383 by the force of the associated return spring, because the frictional force under load overcomes the effect of the return force of the lifting spring 368. If, however, the engagement between the teeth 385 of the safety latch 381 and the detent notches 361 occurs under no load, the return force of the lift spring 368 is sufficient to rotate the safety latch 381 clockwise out of locking position shown in FIG. 5 should the associated activating lever (not shown) be moved into the released position. In this event the arresting lever 369, which is hingedly connected with the activating lever is in a position shifted to the right relative to the illustration of FIG. 5, where the pin 370, which is attached to the detent latch 381 and together with a longitudinal hole 371 of the arresting lever 369 forms a pin-slot connection, is spaced from the edges of the longitudinal hole 371, so that the safety latch 381 can move under the influence of the return force, should this movement not be prevented by the self-arresting features under load. However, if the activating lever moves out of the released position into the arresting position and the safety latch 381 is in the disengaged position, the contact of the pin 370 on the outer edge 373 of the longitudinal hole 371 will forcibly engage the safety latch 381.

Accordingly, the same control of the safety latch 381 results as is achieved in the exemplary embodiment according to FIG. 4 with regard to the safety slide 264.

Figure 6:
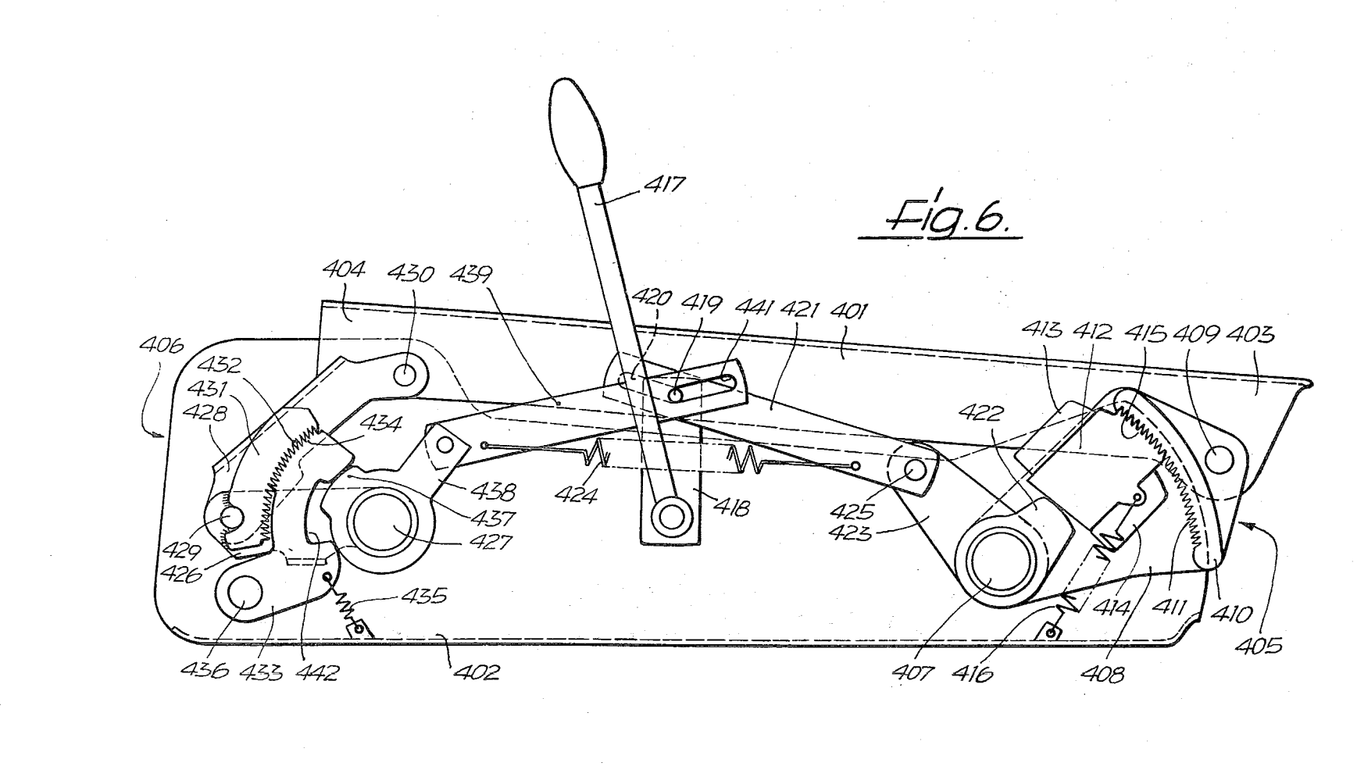
FIGS. 6 and 7 are side views of fittings for seat height adjustment, which are equipped with exemplary embodiments of the apparatus according to the present invention.

FIG. 6 shows a fitting for the height adjustment of the seat surface of a vehicle seat. An upholstery support 401 of the seat portion is arranged such that its position can be adjusted relative to the seat lower portion 402 serving as a support element. In the embodiment illustrated, the position adjustment at the rear end 403 of the upholstery support 401 can be performed independently of the position adjustment at the front end 404. In other words two fittings 405 and 406 are provided, each of which is equipped with a device to prevent untimely cancellation of the detent engagement between the structural components engaged with each other. A pivotably mounted guide 408 mounted on a pivot pin 407 of the lower seat portion 402 is provided on the rear end 403 of the fitting 405 as an adjustable fitting element. This guide 408 is formed as a flat steel plate which is hinged at its end opposite the pivot pin 407 to the upholstery support 401 by means of a bolt 409. In the vicinity of the guide 408 adjacent the bolt 409 a curved detent segment 410 is welded to the guide 408. A detent notch section 410 is formed thereon on the edge facing the pivot pin 407, which section 410 runs concentrically to the axis of the pivot pin 407 and the shape of the detent teeth is the saw tooth type. To form the detent engagement to secure the position of the guide 408 a detent slide 412 is provided which can slide axially in guide bodies 413 and 414 rigidly connected with the lower seat portion 402 serving as the support element. On the front end facing the detent notches 411 the detent slide 412 carries teeth 415—the shape of which is also saw tooth-like—and which are provided for engagement with the detent notches 411. A lift spring 416 is provided to produce a return force which tends to move the detent slide 412 so that the teeth 415 disengage the notches 411.

An activating lever 417 which is pivotably mounted on the lower seat portion 402 is connected with an activating arm 418 so as to rotate therewith. This activating arm 418 carries an activating pin 419 which engages in a longitudinal hole 420 of an arresting lever 421. In the illustration of FIG. 6 the activating lever 417 and the arresting lever 421, which is coupled therewith by means of the pin-slot connection (activating pin 419 and longitudinal hole 420), is in the arrest position. In this position a control cam 422, which rotates with a control lever 423 and is rotatably mounted on the pivot pin 407, is in a position where it abuts the rear end of the detent slide 412 and forces it into the illustrated locking position. If the activating lever 417 is rotated clockwise out of the shown arresting position into the released position associated with the fitting 405, then the activating pin 419 on the right end of the longitudinal hole 420 pushes the arresting lever 421 to the right against the force of an arresting spring 424 acting thereon with one end, whereby the control lever 423, which is hinged to the arresting lever 421 by a pin 425 is rotated clockwise. The control cam 422 is thereby moved away from the inner end of the detent slide 412. The detent slide 412 can then be moved out of the illustrated locking position into a retracted position by the return force of the lift spring 416, where the engagement between the teeth 415 and the detent notches 411 is released. Because of the saw tooth shape, however, the engagement is self-arresting, i.e., the moving of the detent slide 412 out of the shown locking position only takes place when the vehicle seat is under no load, i.e., when the force on the detent engagement is not so high that the friction force produced by the shape of the teeth overcomes the effect of the lift spring 416.

The transfer of the detent slide 412 out of the retracted position into the locking position shown in the drawing occurs forcibly when the operator moves the activating lever 417 back into the illustrated arresting position. In this event the arresting spring 424, which is stronger than the lift spring 416, moves the arresting lever 421 into the position shown in FIG. 6, so that through corresponding movement of the control lever 423 and the control cam 422 the detent slide 412 is pushed into the locking position.

The fitting 406 provided on the other end 404 includes as the adjustable fitting element a guide 426, which, like the guide 408, is pivotably mounted on a pivot pin 427 associated with the lower seat portion 402 serving as the support element. In contrast to the fitting 405, with the fitting 406 the guide 426, however, is not hinged directly to the upholstery support 401, but is rather connected therewith by means of an intermediate articulated lever 428, which is pivotably connected on one end to the guide 426 by a pin 429 and on the other end to the upholstery support 401 by a pin 430.

A detent segment 431, the edge of which faces the pivot pin 427 is provided with detent notches 432 running concentrically to the axis of the pivot pin 427, is welded to the front side of the guide 406. A detent latch 433, the teeth 434 of which have a saw tooth shape like the detent notches 432, is provided for the engagement with the detent notches 432, so that here too the detent engagement is self-arresting and the force of a lift spring 435 tending to rotate the detent latch 433 clockwise about a pivot pin 436 is overcome when the detent mechanism is in the engaged condition.

The detent latch 433 is in this exemplary embodiment also can be forcibly rotated into the locking position by means of a control cam 437, as shown in FIG. 6. The control cam 437 is attached to a control lever 438 which is rotatably mounted on the pivot pin 427 and is controlled by means of an arresting lever 439. The other end of the arresting spring 424 acts on the arresting lever 439 and is attached at one end to the other arresting lever 421. Through contact of the activating pin 419 with the left edge of a longitudinal hole 441 in the arresting lever 439, when the activating lever 417 is rotated counter-clockwise the arresting lever 439 is pushed to the left. The thus effected rotation of the control lever 438 and the control cam 437 in a counter-clockwise direction brings the latter into the vicinity of an opening 442 in the detent latch 433, so that the latch can be rotated out of the locking position under the influence of the return force of the lift spring 435, in case the stronger frictional force on the detent engagement acts in the self-arresting manner and overcomes the force of the lift spring 435.

When the activating lever 417 is moved back into the illustrated arresting position, the arresting spring 424, which is stronger than the lift spring 435, pulls the elements back into the position shown in FIG. 6, where the following of the control cam 437 along the edge surface of the detent latch 433 facing it forced the latch into the locking position.

Figure 7:
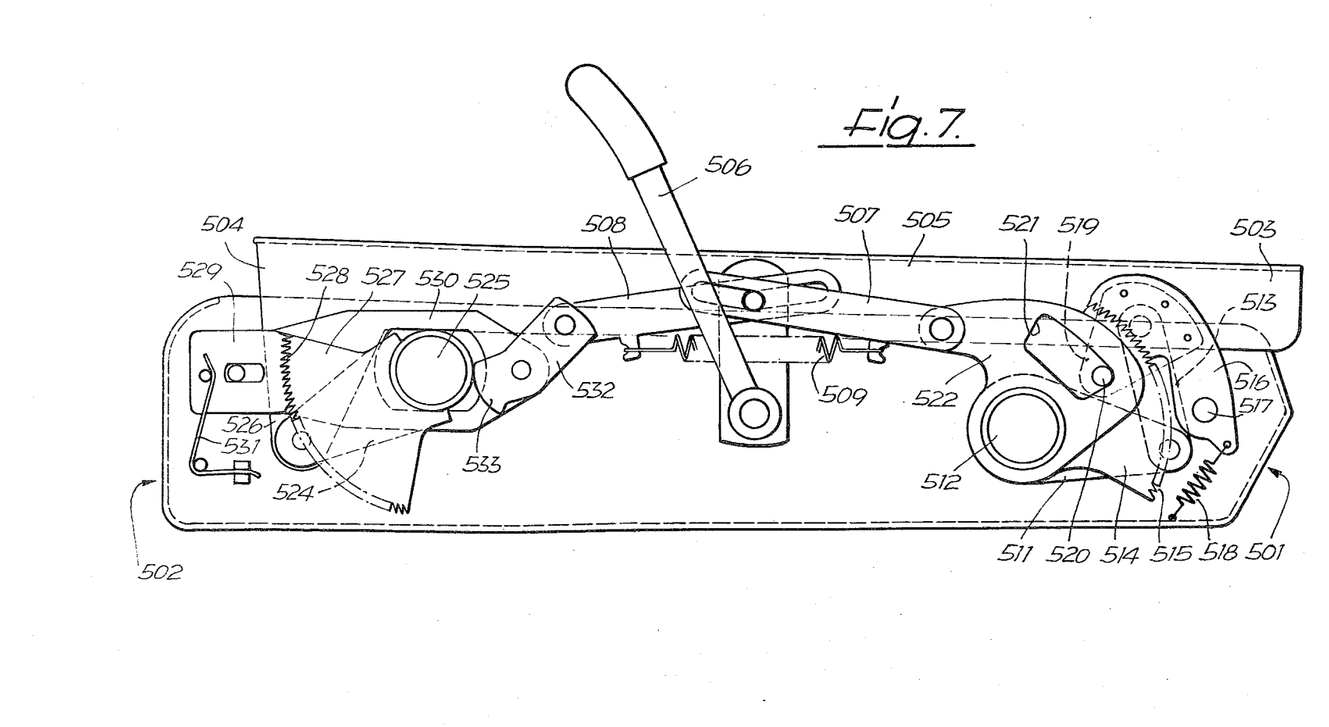

FIG. 7 also shows an exemplary embodiment in which both fittings 501 and 502, which are arranged on respective ends 503, 504 of an upholstery support 505, can be controlled by means of a common activating lever 506. For this purpose arresting levers 507 and 508 can be moved against the force of an arresting spring 509 in a manner similar to the embodiment of FIG. 6. In the fitting 501 a guide 511, which serves as the adjustable fitting element is pivotably mounted on a pivot pin 512. The opposite end of the guide 511 is hingedly connected with the upholstery support 505 by means of an articulated lever 513. The guide 511 carries a detent segment 514 rigidly connected therewith, the detent notches 515 of which run concentrically to the axis of the pivot pin 512 and have the saw tooth shape. A detent latch 516 also having saw tooth shaped teeth provided for the cooperation with the detent latch 515, is pivotably mounted on the lower portion of the seat on a bolt 517. A lift spring 518 tends to rotate the detent latch 516 clockwise out of the illustrated locking position. This can only take place if the detent latch 516 is not forced into the locking position by the arresting spring 507 or if the self-arresting frictional force produced by the saw tooth shaped detent engagement when under a load and when the activating lever 506 is in the released position does not overcome the return forces of the lift spring 518.

For the forced transfer of the detent latch 516 into the locking position illustrated in FIG. 7, the latch is riveted to an activating plate 519. A carrier pin 520 is attached thereto which engages in an opening 521 in a control plate 522. Control plate 522 is rotatably mounted on the pivot pin 512 and is controlled by the arresting lever 507 hinged thereto. When the arresting lever 507 is pushed to the right out of the position shown in FIG. 7, the pin 520 no longer lies against the edge of the opening 521, so that it is possible for the detent latch 516 to move out of the locking position under the influence of the force of the lift spring 518. However, if the arresting lever 507 is moved back into the position shown in FIG. 7, the contact of the pin 520 against the edge of the opening 521 forcibly rotates the detent latch 516 into the illustrated locking position.

The other end 504 of the fitting 502 includes a guide 524 as the adjustable fitting element, which is hinged on one side to pivot pin 525 and on the other side to a projection 526 of the upholstery support 505. As with the fitting 501, in the fitting 502 a detent segment 527 having saw tooth shaped detent notches 528 is connected to the guide 524.

In this exemplary embodiment a detent slide 529 is provided for the cooperation with the detent notches 528. The teeth of this detent slide 529, like those of the detent notches 528 are shaped like saw teeth and the detent slide 529 is attached to the front side of a slide plate 530 guided on the pivot pin 525 for a horizontal shifting movement. A lifting spring 531 engages the detent latch 529 and is formed as a shank spring for moving the detent latch 529 out of the illustrated locking position to the left.

The slide plate 530 and therewith the detent slide 529 can be forcibly moved into the illustrated locking position by a control lever 532 hinged to the arresting lever 508 and to the slide plate 530. This control lever 532 forms a control cam 533 on one end which abuts the pivot pin 525 when the activating lever 506 is in the arresting position. By rotating the activating lever 506 counter-clockwise the control lever 532 is also rotated so that the control cam 533 loses contact with the pivot pin 525. The slide plate 530 and the detent slide 529 can then be moved to the left by the return force of the lift spring 531, as long as the frictional force produced by the saw tooth shape acts to self-arrest when the engaged elements of the detent mechanism stand under a load.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An apparatus for setting a fitting element which is adjustable relative to a support element to various positions, particularly for vehicle seats comprising:
   a locking device which is self-arresting under a load from a return force which tends to move the fitting element into an end position of its range of adjustment and which has at least two locking elements that engage each other by teeth in order to prevent movement of the fitting element,
   one of the locking elements being a detent disc positioned on the fitting element, and
   said other of the locking elements being a detent member movably guided on the support element and also being movable forcibly only into a locking position against a reset force by an activating member.

2. Apparatus according to claim 1, wherein at least tooth flanks of the teeth of the locking elements which abut each other under a load from the return force have an inclined angle relative to the direction of movement of the movably guided locking element dtent member which is at least equal to the resting frictional angle.

3. Apparatus according to claim 2, wherein the teeth are of a saw tooth shape.

4. Apparatus according to claim 1, wherein the detent member is a slide.

5. Apparatus according to claim 1, wherein the detent member which can be moved by the activating member is formed by a latch.

6. Apparatus according to claim 5, wherein only the latch has a tooth shape which fulfills the condition for self-arresting.

7. Apparatus according to claim 1, further comprising:
   at least one spring means, which acts on the locking device, for producing the return force and which can be moved by the activating member.

8. Apparatus according to claim 1, adapted for an articulated fitting of a motor vehicle in which the fitting element which is adjustable to change the angle of inclination of a backrest is rotatably mounted on the support element connected with a lower seat portion and in which the locking device is provided which in an unlocked position allows a movement of the backrest relative to the support element even when the detent member is in engagement with the teeth of the detent disc, further comprising a pre-biased return spring means for producing a return force, said spring means acting on the support element and on the fitting element, and which spring means exerts a force thereon in the sense of a return of the fitting element into the position corresponding to the steepest setting of the backrest.

9. Apparatus according to claim 1 for setting a fitting element for the height adjustment of a vehicle seat, wherein an adjustable fitting element is provided with teeth formed as a guide which is pivotably mounted on the support element associated with a lower seat portion and which is hingedly coupled with an upholstery support to transfer its rotational movement into an adjusting movement of the upholstery support of the vehicle seat having a vertical component.

* * * * *

UNITED STATES PATENT AND TRADEMARK OFFICE
CERTIFICATE OF CORRECTION

PATENT NO. : 4,406,497
DATED : September 27, 1983
INVENTOR(S) : Bernd Klüting

It is certified that error appears in the above—identified patent and that said Letters Patent is hereby corrected as shown below:

Claim 2, line 5, delete "locking element"; and change "dtent" to --detent--.

Signed and Sealed this

Twenty-fifth Day of December 1984

[SEAL]

Attest:

Attesting Officer

GERALD J. MOSSINGHOFF

Commissioner of Patents and Trademarks